Feb. 1, 1944. D. L. GALLUP ET AL 2,340,462
BRAKE
Filed April 26, 1940 2 Sheets-Sheet 1
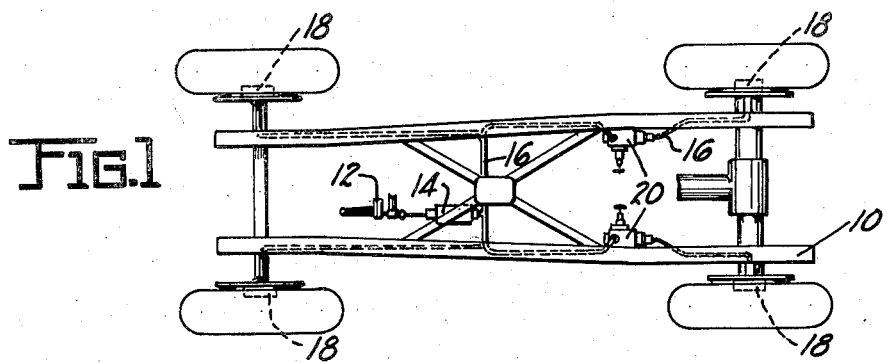
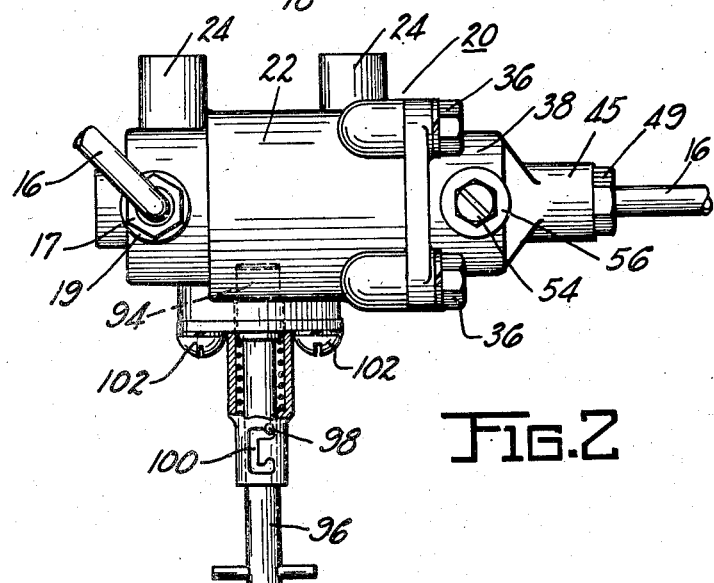
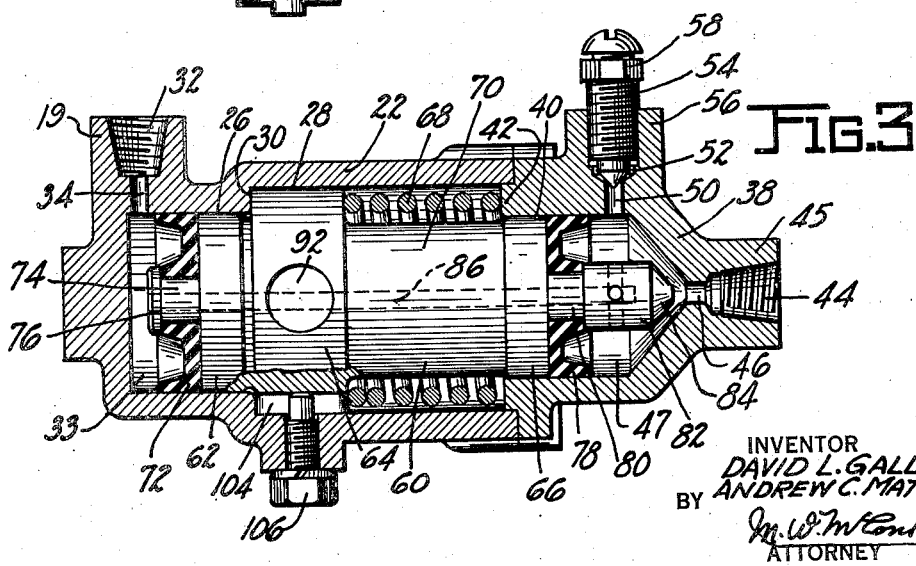
INVENTOR
DAVID L. GALLUP
ANDREW C. MATHIESON
BY
M. W. McConkey
ATTORNEY Feb. 1, 1944.     D. L. GALLUP ET AL     2,340,462
BRAKE
Filed April 26, 1940     2 Sheets-Sheet 2

INVENTOR
DAVID L. GALLUP
ANDREW C. MATHIESON
BY
ATTORNEY

Patented Feb. 1, 1944

2,340,462

UNITED STATES PATENT OFFICE 2,340,462

BRAKE

David L. Gallup and Andrew C. Mathieson, South Bend, Ind., assignors to Bendix Aviation Corporation, South Bend, Ind., a corporation of Delaware Application April 26, 1940, Serial No. 331,740

10 Claims. (Cl. 188—152)

This invention relates to fluid pressure braking systems for motor vehicles and more particularly to means for controlling the pressures used to apply the brakes.

An object of this invention is to provide a pressure limiting device for regulating the fluid pressures affecting the fluid motors located in one set of wheels only.

An important object of this invention is to provide a pressure limiting device which will completely close the pressure lines communicating with certain braking fluid motors, thereby limiting the pressures affecting those motors to a predetermined amount.

A further object of this invention is to provide a device of the kind which will hold the brakes applied until the brake pedal is moved towards the fully released position.

Still another object of this invention is to provide means under the control of the operator for locking the aforesaid device in an inoperative position, thereby allowing the full braking pressures to operate the wheel fluid motor in the usual manner.

Where streets are made slippery by rain or snow, it is often desirable to control the amount of braking of the rear wheels and it is, accordingly, still another important object of this invention to provide means by which the relative fluid pressures affecting the rear wheel braking motors may be varied in accordance with any given driving condition.

These and other objects of the invention will become apparent from inspection of the following specification when read with reference to the accompanying drawings wherein are illustrated several embodiments of this invention. It is to be expressly understood, however, that the drawings are for purposes of illustration only and are not designed as a definition of the limits of the invention, reference being had to the appended claims for this purpose.

In the drawings, wherein like numerals indicate like parts throughout the several views:

Figure 1 is a diagrammatic plan view of an automobile chassis whereon is installed a valve forming, by itself and in combination with other elements, the subject matter of this invention;

Figure 2 is an enlarged plan view of the valve;

Figure 3 is a view in section taken substantially on line 3—3 of Figure 2;

Figure 4:
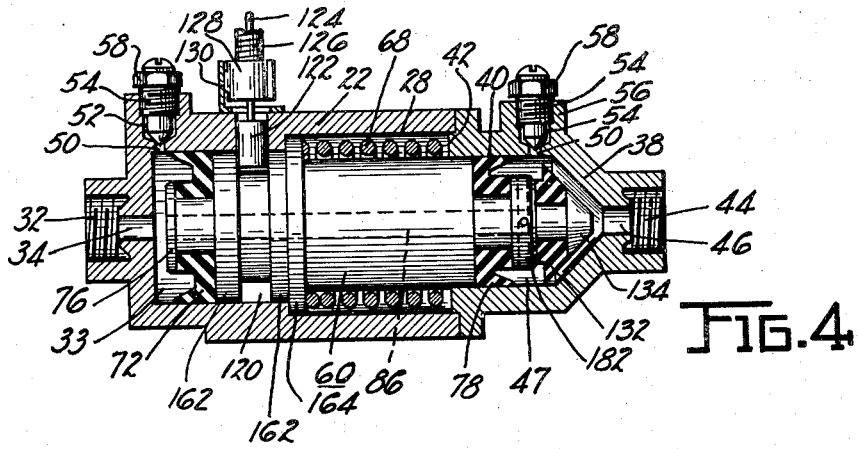
Figure 4 is a view in section showing a modification of the valve of Figure 3.

In the drawings, 10 indicates, generally, a vehicle chassis wherein is installed a brake pedal 12, a pressure creating device 14, conduit lines 16 and a plurality of fluid motors 18, one at each wheel, for effecting the braking of the vehicle. The detailed construction of the pressure creating device and of the various wheel fluid motors will not be given, it being assumed they are of conventional design.

Load limiting devices 20 are placed in one or more of the conduit lines 16 for the purpose of limiting the pressure affecting the various fluid motors and one of these devices, forming more particularly the subject matter of this invention, will now be described.

Referring to the drawings, 22 represents a casing having a plurality of interiorly threaded bosses 24 for attaching it to a vehicle chassis by bolts passing through the frame. Conduit 16 is connected to an interiorly threaded boss 19, formed on one end of the casing 22 by means of an exteriorly threaded fitting 17 and supplies fluid from the pressure creating device 14 to the interior of said casing.

Referring more especially to Figure 3, the interior of the casing 22 is provided with a small bore 26, a large bore 28 and a shoulder 30 formed therebetween. An inlet port 32 in the boss 19 communicates with a chamber 33 within the bore 26 through a passage 34. Closing the open end of the casing 22 and attached thereto by bolts 36, is a plug or an end member 38. This plug is provided with a bore 40 of a diameter different from that of either bore 26 or 28 of the casing 22. Formed on one end of the plug 38 is a ring 42, the outer circumference of which coincides with and is adapted to fit within the bore 28. A discharge port 44 in a boss 45 is provided in the other end of the plug 38 and said port communicates with a chamber 47 within the bore 40 through a passage 46. Conduit 16 is connected to the interiorly threaded boss 45 by means of an exteriorly threaded fitting 49 and conveys fluid to the wheel fluid motors.

Communicating with the chamber 47, by means of a passage 50, is a chamber 52 provided to receive any air which might enter the fluid system. This chamber can be vented to the atmosphere for bleeding by removing a screw 54 which threadedly engages the inside of a boss 56, formed on the plug 38. A locking nut 58 on the screw 54 is provided to prevent the latter from accidently working loose.

A compound piston, generally indicated at 60, is provided with a plurality of individual pistons numerically designated as 62, 64 and 66 of varying diameters corresponding with the bores 26, 28 and 40, respectively, in the casing 22 and plug 38. This piston 60 is adapted to have a reciprocal motion within the casing 22 and the plug 38 in response to a fluctuation of fluid pressures within the system. A large coiled compression spring 68 has its opposite ends abutting the faces of the piston 64 and of the ring 42 and is housed within a space formed between a reduced portion 70 of the piston 60 and the bore 28. This spring 68 may be of any desired strength and serves to limit the fluid pressure which may be applied to the wheel motors 18.

A packing cup 72 is held against the piston 62, on a boss 74 extending from the central portion of the piston by means of a bolt 76 threadedly connected into the said boss. A second packing cup 78 is likewise held against the piston 66 by means of a member 82 which threadedly engages the inside of a boss 80 projecting from the piston. A washer 84, threadedly connected into the end of the member 82, is made of a suitable sealing material and is adapted to have fluid sealing contact with the inside of the plug 38 when the compound piston 60 is moved to the right (see Figure 3) as hereinafter described.

Passing axially through the center of the compound piston 60 is a fluid passageway 86. This passage begins in the nut 76 and terminates in the member 82 and is adapted to interconnect the fluid chambers 33 and 47.

An opening 92 is provided in the piston 64 for the insertion of a locking plunger 94 (see Figure 2) which at times holds the piston against movement. As shown in this figure, the plunger is in locked position. This plunger is controlled by a manually operable handle 96 and may be either held in the opening 92 or withdrawn therefrom by locating a pin 98 in the proper side of a U-shaped groove 100. The entire locking assembly is held in place on the casing 22 by screws 102. The piston 64 has, on its lower side, a groove 104 into which extends a bolt 106, the function of which is that of preventing the piston from rotating within the casing 22.

The construction shown in Figure 4 is a modification of that already described in regard to Figure 3 and differs therefrom in that the inlet port 32 and the passage 34 are in line with the axial passage 86 through the compound piston 60.

A circular groove 120 is cut in the individual piston 162 to accommodate a locking plunger 122 which functions to hold the compound piston stationary as above described. The plunger 122 is controlled by means of a flexible wire 124 housed within a sheath 126, which in turn is attached to the casing 22 by means of coupling members 128 and 130. Because of this particular construction, it is not necessary to provide means to prevent the compound piston 60 from rotating within the casing 22. A sealing washer 132, differing slightly from that shown in Figure 3, is held in place by a nut 134 threadedly connected into the member 182. An additional air vent having parts identical to those shown in Figure 3 is provided in the left side of casing 22, thereby permitting the venting of any air which may become trapped in the upper part of chamber 33.

In the operation of the device thus far described, assuming that the locking plungers shown in Figure 2 and Figure 4 have been moved to the released positions, fluid pressure is developed in the conduits 16 by the brake pedal operating the pressure creating device 14. This fluid enters the chamber 33 through the inlet port 32 and passage 34. The fluid immediately exerts a force against the packing cup 72 to move the compound piston 60 towards the right. Some of the fluid immediately passes axially through the passage 86 in the compound piston 60 to the chamber 47 and exerts a force against the packing cup 78 to oppose the force acting on the piston 60 at the packing cup 72. Fluid also passes through the outlet port 44 by way of passage 46 and is effective in the various wheel fluid motors 18 to take up the slack in the brake assembly and bring the brake linings very lightly into contact with the respective brake drums.

It will be observed that the two piston heads of piston 60 are of unequal diameters, and, since the piston head 62, 162 has the larger area, the piston 60 will be urged to the right under the differentials of force exerted. It will further be observed that the compression spring 68 is so positioned that it opposes this movement and therefore assists the packing cup 78 in maintaining the compound piston 60 in its leftwardly position. The area of the packing cup 72 is enough greater than that of the packing cup 78 so that the differentials in pressures are able to overcome the force of the spring 68 at its fully compressed position.

As the pressure of the fluid increases in response to a further depression of the brake pedal, the compound piston 60 is gradually moved towards the right until the washers 84 or 134 are forced into fluid sealing contact with the inside of the plug 38, thereby completely closing the outlet and thereafter holding the pressure in the conduits 16 beyond the said washers constant. If, at this point, the pressure is increased by a still further depression of the brake pedal, the washers 84 and 134 are merely forced more tightly against the inside of the casing and the wheel fluid motors therebeyond will be unaffected.

As the pressure is decreased, by releasing the brake pedal, a point will be reached where the pressure acting on the smaller packing cup 78, plus the energy stored in the return spring 68, will overcome the decreasing pressure on the larger packing cup 72 and the compound piston 60 will return to released position.

The full braking pressure may be effective in the wheel fluid motors 18 by placing the locking plungers 94 or 122 in the positions shown in Figure 2 and Figure 4, thereby holding the piston 60 against all movement.

Although this invention has been described in connection with certain specific embodiments, the principles involved are susceptible of numerous other applications which will readily occur to persons skilled in the art. The invention is to be limited only as indicated by the scope of the appended claims.

Having thus described the various features of this invention, what we claim as new and desire to secure by Letters Patent is:

1. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet ports and a plunger located therebetween and movable axially under the influence of braking pressure, and a locking device for holding said plunger against movement in either direction.

2. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter, and a pressure limiting device in one of said lines, said device having inlet and outlet ports, a plunger located therebetween and movable axially under the influence of braking pressure, resilient means for biasing said plunger towards the inlet port, and a locking device for holding said plunger against movement.

3. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet ports, a plunger located therebetween and movable axially under braking pressure, said plunger having a passageway axially therethrough permitting a transfer of fluid from the inlet to the outlet ports, and packing cups located on opposite sides of said plunger, said cups being of unequal diameters and being so arranged that pressures prevailing in the braking system are exerted against both of them at all times.

4. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet ports, a plunger located therebetween and movable axially under braking pressure said plunger having a passageway axially therethrough permitting a transfer of fluid from the inlet to the outlet ports, packing cups located on opposite sides of said plunger, said cups being of unequal diameters and being so arranged that pressures prevailing in the braking system are exerted against both of them at all times, and a sealing member carried on the outlet side of said plunger, said member being adapted to close said outlet port at a predetermined braking pressure.

5. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet chambers, a piston located between said chambers and movable axially under the influence of fluid pressure in said chambers, said piston having an axial passageway therethrough permitting a free transfer of fluid from one chamber to the other, packing cups of unequal diameters located on opposite sides of said piston, a sealing member disposed in the outlet chamber for closing said outlet at a predetermined fluid pressure, and means for venting said outlet chamber of air trapped therein.

6. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet ports, a plunger located therebetween and movable axially under the influence of said braking pressure, resilient means for biasing said plunger towards the inlet port, a locking device for holding said plunger against movement in either direction and means for manually controlling said locking device.

7. A fluid pressure actuated braking system having a plurality of force applying members, manually operable means to apply the brakes, connecting means between the manually operable means and the force applying means, and a pressure actuated load limiting device comprising a piston movable axially in response to braking pressures, and a plurality of packing cups of unequal diameters secured to the piston associated with the connecting means and being so arranged that pressures prevailing in the braking system are exerted against both of them at all times.

8. In a braking system for an automotive vehicle, means to create braking pressure within said system, a plurality of fluid motors located at the front and rear wheels of said vehicle, fluid pressure lines interconnecting said means and all of said fluid motors for effecting a transfer of braking pressure from the former to the latter and a pressure limiting device in one of said lines, said device having inlet and outlet chambers, a piston located between said chambers and movable axially under the influence of fluid pressure in said chambers, said piston having an axial passageway therethrough permitting a free transfer of fluid from one chamber to the other, packing cups of unequal diameters located on opposite sides of said piston, a sealing member disposed in the outlet chamber for closing said outlet at a predetermined fluid pressure, resilient means for biasing said piston towards the inlet chamber, means for venting said chambers of air trapped therein and means for locking said piston against movement in either direction.

9. In a braking system having pressure creating means, a fluid motor, and a conduit for transmitting pressure fluid from said pressure creating means to said fluid motor, a pressure regulating device interposed in said conduit and comprising a chamber communicating with said pressure creating means, a second chamber normally communicating with said fluid motor, a double diameter piston reciprocable in the said device, both ends of the piston being at all times subjected to pressures prevailing in the fluid of the braking system, a passage connecting the two chambers, and means controlled by the piston for at times cutting off communication between the said fluid motor and the chamber normally connected thereto.

10. In a braking system having pressure creating means, a fluid motor, and a conduit for transmitting pressure fluid from said pressure creating means to said fluid motor, a pressure regulating device interposed in said conduit and comprising a chamber communicating with said pressure creating means, a second chamber normally communicating with said fluid motor, a double diameter piston reciprocable in the said device, both ends of the piston being at all times subjected to pressures prevailing in the fluid of the braking system, a spring urging said piston in one direction, a passage connecting the two chambers, and means controlled by the piston for at times cutting off communication between the said fluid motor and the chamber normally connected thereto.

DAVID L. GALLUP.
ANDREW C. MATHIESON.